(12) United States Patent
Nilsson (10) Patent No.: US 11,542,706 B2
(45) Date of Patent: Jan. 3, 2023

(54) PROFILE MEMBER AND METHOD FOR MANUFACTURING THEREOF

(71) Applicant: SAINT-GOBAIN ECOPHON AB, Hyllinge (SE)

(72) Inventor: Thomas Nilsson, Helsingborg (SE)

(73) Assignee: SAINT-GOBAIN ECOPHON AB, Hyllinge (SE)

( * ) Notice: Subject to any disclaimer, the term of this patent is extended or adjusted under 35 U.S.C. 154(b) by 0 days.

(21) Appl. No.: 16/753,371

(22) PCT Filed: Oct. 1, 2018

(86) PCT No.: PCT/EP2018/076554
§ 371 (c)(1),
(2) Date: Apr. 3, 2020

(87) PCT Pub. No.: WO2019/068594
PCT Pub. Date: Apr. 11, 2019

(65) Prior Publication Data
US 2020/0332526 A1 Oct. 22, 2020

(30) Foreign Application Priority Data
Oct. 4, 2017 (EP) ..................................... 17194685

(51) Int. Cl.
*B23K 26/22* (2006.01)
*E04B 9/06* (2006.01)
(Continued)

(52) U.S. Cl.
CPC .............. *E04B 9/068* (2013.01); *B23K 26/22* (2013.01); *B23K 26/262* (2015.10);
(Continued)

(58) Field of Classification Search
CPC ...... B23K 26/22; B23K 26/26; B23K 26/262; E04C 2003/046
See application file for complete search history.

(56) References Cited

U.S. PATENT DOCUMENTS 4,713,919 A * 12/1987 Platt ........................ E04B 9/067
52/232
5,483,782 A 1/1996 Hall
(Continued)

FOREIGN PATENT DOCUMENTS

DE 102016222402 A1 * 5/2018
JP H06170568 A 6/1994
(Continued)

OTHER PUBLICATIONS

Machine translation of Japan Patent No. 2004-306,057-A, Jul. 2021 (Year: 2021).*
(Continued)

*Primary Examiner* — Geoffrey S Evans
(74) *Attorney, Agent, or Firm* — Brundidge & Stanger, P.C.

(57) ABSTRACT

A method for manufacturing a profile member for a suspended ceiling system, comprising forming a sheet metal material into an elongate T-shaped profile member with a web having two web side walls and a pair of oppositely disposed flanges projecting from a bottom portion of the web, and laser welding the elongate T-shaped profile member for providing a laser weld joint extending in a longitudinal direction of the T-shaped profile member and joining the two web side walls to each other. The step of laser welding comprises alternatingly performing a first operation and a second operation, the second operation being different from the first operation, whereby a laser weld joint is provided comprising along its extension alternating welded first sections associated to the first operation and second (Continued)

sections associated to the second operation. The present invention also relates to an elongate profile member provided with a laser weld joint.

10 Claims, 5 Drawing Sheets (51) Int. Cl.
- *B23K 26/262* (2014.01)
- *B23K 101/28* (2006.01)
- *E04C 3/04* (2006.01)

(52) U.S. Cl.
CPC ..... *B23K 2101/28* (2018.08); *E04B 2009/062* (2013.01); *E04C 2003/046* (2013.01)

(56) References Cited

U.S. PATENT DOCUMENTS

| | | | | |
|---|---|---|---|---|
| 5,760,365 A * | 6/1998 | Milewski | ............... | B23K 26/06 |
| | | | | 219/121.64 |
| 5,896,724 A * | 4/1999 | Tofts | ............... | E04B 9/068 |
| | | | | 52/842 |
| 7,516,585 B2 * | 4/2009 | Lehane, Jr. | ............... | E04B 9/068 |
| | | | | 29/897.312 |
| 8,607,457 B2 * | 12/2013 | Huemmer | ............... | F16K 27/10 |
| | | | | 29/890.129 |
| 2007/0175152 A1 * | 8/2007 | Kupec | ............... | E04B 9/068 |
| | | | | 52/506.07 |
| 2007/0277468 A1 * | 12/2007 | Platt | ............... | E04B 9/068 |
| | | | | 52/506.07 |
| 2010/0282722 A1 * | 11/2010 | Ramsayer | ............... | B23K 26/0823 |
| | | | | 219/121.64 |
| 2014/0147693 A1 * | 5/2014 | Yasuyama | ............... | B21D 21/00 |
| | | | | 428/594 |
| 2015/0314392 A1 | 11/2015 | Haschke et al. | | |
| 2018/0068691 A1 * | 3/2018 | Okamoto | ............... | G11B 33/148 |

FOREIGN PATENT DOCUMENTS

| | | |
|---|---|---|
| JP | 2004306057 A * | 11/2004 |
| RU | 1345499 A1 | 11/1993 |
| RU | 2209994 C2 | 8/2003 |
| RU | 2318640 A | 3/2008 |
| RU | 2389591 C2 | 5/2010 |
| RU | 2606667 C2 | 1/2017 |

OTHER PUBLICATIONS

International Search Report from International Application No. PCT/EP2018/076554, dated Oct. 29, 2018.
Russian Office Action dated Jan. 28, 2021.
Russian Office Action dated Sep. 14, 2021.

* cited by examiner

PROFILE MEMBER AND METHOD FOR MANUFACTURING THEREOF

FIELD OF THE INVENTION

The present invention relates to a profile member for a suspended ceiling system and a method for the manufacturing thereof.

BACKGROUND ART

A suspended ceiling system in a room or in another accommodation may serve a variety of purposes. One purpose of having a suspended ceiling system may be to conceal an underside of a space, such as another room, which is located above the room. Another purpose may be to provide improved noise absorption and/or noise attenuation in and outside of the room. The resulting plenum space located between the suspended ceiling and a main ceiling of the room may further be utilized to accommodate e.g. wiring, piping, as well as devices related to heating, ventilation, and air condition.

Typically, the suspended ceiling consists of a plurality of ceiling tiles which are fitted into a supporting grid of profile members which is mounted in the main ceiling.

A profile member may be formed from a sheet of metal into the shape of an inverted T. The profile member may comprise a web having two web side walls and a pair of oppositely disposed flanges projecting from a bottom portion of the web. A reinforcing bulb may be formed at a top portion of the web.

It is desirable to keep the weight of the profile member as low as possible while still ensuring sufficent mechanical strength.

The strength and rigidity of the profile member may be improved by joining the the two web side walls to each other. Thus, a profile member having two web side walls joined together may be made of a relatively thin sheet of metal and still have sufficient mechanical strength.

The two web side walls may be joined in different ways, such by riveting or screwing.

Alternatively, the web side walls may be joined by gluing as disclosed in U.S. Pat. No. 4,554,718, or by stitching as disclosed in EP2964850.

Attempts of joining the web side walls by welding have also been made, for instance by laser welding as disclosed in U.S. Pat. No. 4,713,919.

SUMMARY OF THE INVENTION

In view of that stated above, the object of the present invention is to provide an improved laser welded profile member and an improved method for manufacturing such a profile member by laser welding.

It is also an object to provide such a method allowing for high production speed.

A further object is to avoid or minimize thermal induced deformation of the profile member during laser welding thereof.

To achieve at least one of the above objects and also other objects that will be evident from the following description, a method having the features defined in claim 1, and a profile member having the features defined in claim 13 are provided according to the present invention. Preferred embodiments of the method and the device will be evident from the dependent claims.

More specifically, there is provided according to a first aspect of the present invention a method for manufacturing a profile member for a suspended ceiling system, comprising forming a sheet metal material into an elongate T-shaped profile member with a web having two web side walls and a pair of oppositely disposed flanges projecting from a bottom portion of the web, and laser welding the elongate T-shaped profile member for providing a laser weld joint extending in a longitudinal direction L1 of the T-shaped profile member and joining the two web side walls to each other. The step of laser welding comprises alternatingly performing a first operation and a second operation, the second operation being different from the first operation, whereby a laser weld joint is provided comprising along its extension alternating welded first sections associated to the first operation and second sections associated to the second operation.

Hereby an improved method for the manufacturing of a profile member for a suspended ceiling system is provided.

The strength and rigidity, such as the torsional stiffness, may easily be adapted to the actual need. If a high torsional stiffness is desired, which may be the case for a main runner included in a grid of profiles of the suspended ceiling system, the length of each welded first section may be increased and/or the length of each second section may be shortened. On the other hand, if a lesser torsional stiffness is acceptable, which may be the case for a cross runner in the grid of profiles, each welded first section may be shortened and/or the length of each second section may be increased.

The increased strength and rigidity may be utilized such that the thickness of the sheet metal material may be reduced for a profile member intended for a specific load, thereby resulting in reduced costs. Alternatively, a specific thickness may be used for a profile member capable of bearing an increased load.

The increased strength and rigidity will also facilitate handling of the profile member during installation in a grid of profiles since twisting and bending of the profile member during handling may be reduced.

The method may also allow for an increased production rate since the laser welding by alternatingly performing the first and the second operations may permit an increased relative movement between a laser welding apparatus and the work piece, i.e. the profile member.

The inventive method further makes it possible to reduce the thermal load on the profile member during laser welding, thereby eliminating or at least mitigating problems associated with thermal induced deformation of the profile member during laser welding.

The profile member manufactured according to the method may also promote a high degree of dimensional accuracy in a grid of profiles comprising such profile members. As the grid of profiles is formed by a plurality of assembled profile members, the dimensional accuracy of the entire grid may be dependent on the dimensional accuracy of each individual profile member. As mentioned above, the inventive method eliminates or at least mitigates problems associated with thermal induced deformation of the profile member. In addition, the application of a laser weld joint joining the web side walls makes it possible to minimize the presence of a gap between the two web side walls, ensuring that the thickness of the web essentially corresponds to the thickness of the two web side walls. The combined effect is that a profile member is obtained with a high degree of dimensional accuracy.

According to an embodiment, each first operation may comprise laser welding at first energy level and each second operation may comprise laser welding at a second energy level, the second energy level being below the first energy level. Hereby, it is ensured that the thermal load during laser welding is reduced as compared to a continuous laser welding at a constant energy level. The second energy level may even be zero, whereby each second section becomes non-welded section and the thermal load is minimized. The switching between the first and second operation may facilitate the choosing of process parameters, such as energy levels and feeding rate, since the inventive method makes the profile member less prone to thermal induced deformation.

According to another embodiment, each first section may be formed as a point weld. Alternatively, each first section may have a longitudinal extension and may have a length L2 in the range of 2-15 mm.

Further, each second section may be given a length L3 in the range of 1-60 mm. By choosing a smaller length L3, a higher torsional stiffness may be obtained, and by choosing a bigger length L3, a lower torsional stiffness may be obtained. For instance, a length L3 in the range of 1-15, may be chosen for a profile member constituting a main runner for a grid of a suspended ceiling system, and a length L3 in the range of 15-60 mm may be chosen for a cross runner for the grid of profiles.

According to yet another embodiment of the inventive method, the laser welding may be performed at a feeding rate in the range of 20-120 m/min. The feeding rate corresponds to the relative motion between the laser welding apparatus generating the laser beam for laser welding and the work piece, i.e. the profile member.

According to yet another embodiment, the laser weld joint may be applied at the bottom portion of the web. The laser weld joint may be applied in a gap extending in the longitudinal direction of the T-shaped profile member and formed in the bottom portion where the flanges meet the web side walls. In such a case, the laser weld joint will be applied from a bottom side of the profile member.

The step of forming the sheet metal material into the elongate T-shaped profile may be performed in a roll forming operation. The sheet metal material may have a thickness in the range of 0.1-0.6 mm. The sheet metal material may be steel, such as galvanized steel, aluminium or stainless steel.

According to yet another embodiment, the step of forming the sheet metal material into the elongate T-shaped profile member may further comprise forming a bulb adjoining a top portion of the web. Hereby the strength and rigidity of the profile member may be further increased.

According to a second aspect of the present invention, a profile member for a suspended ceiling system is provided, comprising an elongate T-shaped profile member with a web having two web side walls and a pair of oppositely disposed horizontal flanges projecting from a bottom portion of the web. A laser weld joint extends in a longitudinal direction of the T-shaped profile member joining the two web side walls to each other, characterized in that the laser weld joint along its extension comprises alternating welded first sections and second sections, wherein the first sections are different from the second sections, and wherein each first section comprises a weld of conduction/penetration mode or penetration mode.

Hereby an improved profile member for a suspended ceiling system is provided. It may be preferable for the first section of the laser weld joint to be of penetration mode such that it is ensured that the weld exhibits sufficient depth, i.e. forms a weld of key hole type.

The advantages described above with reference to the inventive method are applicable also to the inventive profile member.

According to an embodiment, each second section may comprise a weld of conduction mode. Alternatively, each second section may be a non-welded section. Thus, the second sections are produced at a lower energy level than the energy level used for producing the first sections, and hence the inventive profile member is less likely to exhibit thermal induced deformations as compared to a profile member manufactured by a continuous welding operation at a constant energy level.

According to another embodiment, each first section may be a point weld. Alternatively, each first section may have a length L2 in the range of 2-15 mm.

According to yet another embodiment, each second section may have a length L3 in the range of 1-60 mm.

According to yet another embodiment, the laser weld joint may be arranged at a bottom portion of the web. More specifically, the laser weld joint may be arranged in a gap extending in the longitudinal direction of the T-shaped profile member and formed in the bottom portion where the flanges meet the web side walls.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

DESCRIPTION OF EMBODIMENTS

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
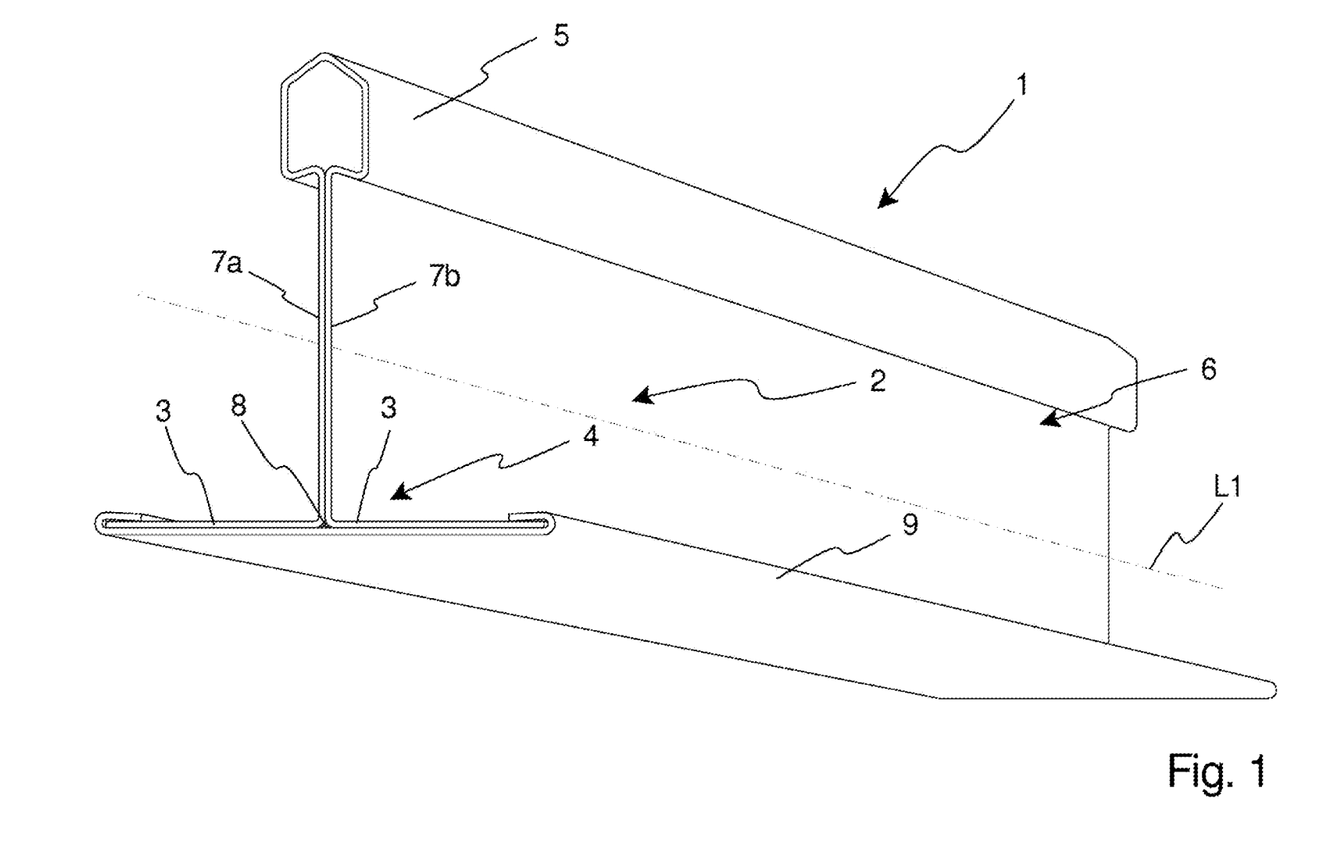
FIG. 1 is a perspective view of a profile member according to the present invention.

An embodiment of a profile member 1 according to the present invention is shown in FIG. 1, to which reference now is made.

The profile member 1 is formed of sheet metal material of for example steel, such as galvanized steel, aluminum, or stainless steel. The profile member 1 has an elongated T-shape and comprises a web 2 and a pair of oppositely disposed flanges 3 projecting from a bottom portion. In the shown embodiment, the flanges 3 are horizontally disposed and project at right angles from the bottom portion 4 of the web 2.

The profile member 1 may also, as shown in the figure, be formed with a bulb 5 adjoining a top portion 6 of the web 2.

The sheet metal material from which the profile member 1 is made may have a thickness in the range of 0.1-0.6 mm.

The web 2 has a two-layered structure and comprises two web side walls 7a, 7b. The two web side walls 7a, 7b are joined to each other by means of a laser weld joint 8 extending in a longitudinal direction of the T-shaped profile member 1 indicated by axis L1. The laser weld joint 8 will be described more in detail below.

A capping 9 in the form of strip of folded sheet metal may be provided enclosing the pair of oppositely disposed flanges 3. The capping 9 may thus cover the laser weld joint 8.

Figure 2:
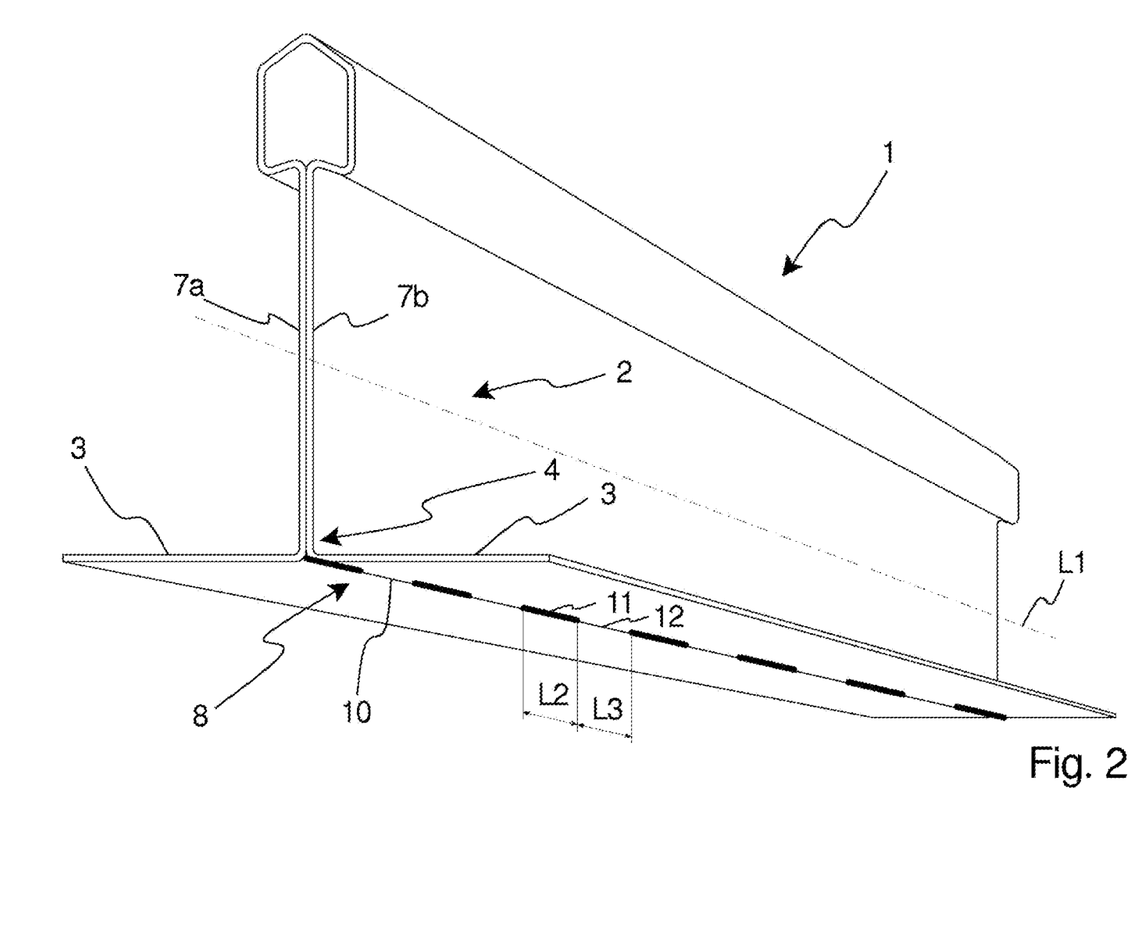
FIG. 2 is a perspective view of an embodiment of a profile member according to the present invention.

In FIG. 2, the profile member 1 shown in FIG. 1 is disclosed without the capping 9 thus exposing the laser weld joint 8.

The laser weld joint 8 extends in the longitudinal direction L1 of the profile member 1. In the shown embodiment, the laser weld joint 8 is arranged in the bottom portion 4 of the web 2. More specifically, the laser weld joint 8 is applied in a gap 10 extending in the longitudinal direction L1 of the profile member 1 and formed in the bottom portion 4 of the web 2 where the horizontal flanges 3 meet the web side walls 7a, 7b.

Figure 3:
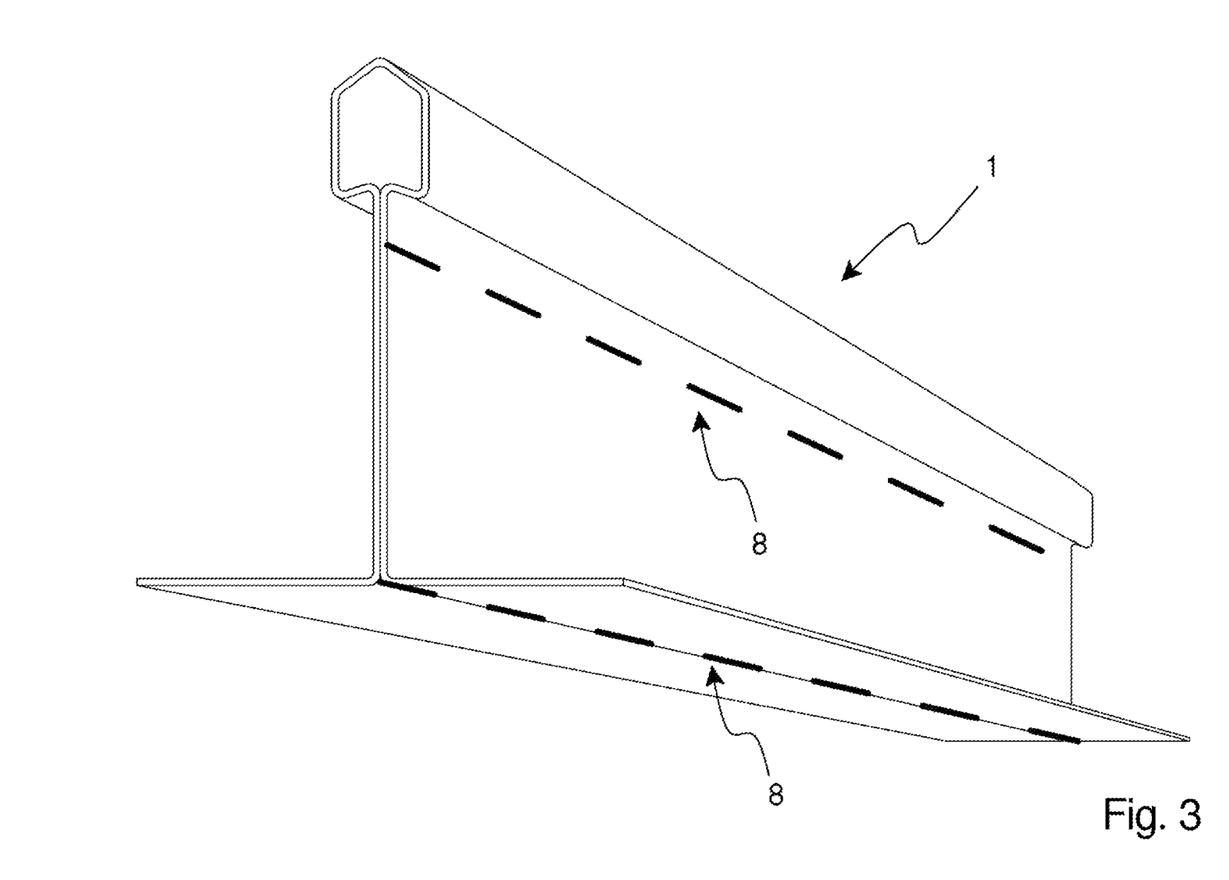
FIG. 3 is a perspective view of an alternative embodiment of a profile member according to the present invention.

It is understood that the laser weld joint 8 may be arranged in a different portion of the web 2. It is also understood that the profile member 1 may be provided with two or more laser weld joints 8 extending in parallel at a distance from each other. In FIG. 3, alternative locations of the laser weld joint 8 are disclosed.

According to the present invention, the laser weld joint 8 comprises along its extension alternating first sections 11 and second sections 12. The first sections 11 are welded and different from the second sections 12.

Each first section 11 is a welded section and may be a point weld or may have a length L2 in the range of 2-15 mm.

Each first section 11 may be a laser weld of conduction/penetration mode type or penetration mode type.

Each second section 12 may be a welded section comprising a laser weld of conduction mode type. Alternatively, each second section 12 may be a non-welded section.

Each second section 12 may have a length L3 in the range of 1-60 mm.

The length L2 of each first section 11 may be equal to the length L3 of each second section 12.

The length L2 of the first sections 11 and the length L3 of the second sections 12 may be chosen dependent on the desired properties of the profile member.

If the profile member is to be used as a main runner in a suspended ceiling system, a high torsional stiffness may be desirable, and the first section 11 may be a point weld or have a length L2 2-15 mm, and the second sections 12 may have a length L3 in the range of 1-15 mm.

On the other hand, if the profile member is to be used as a cross runner in a suspended ceiling system, a lower torsional stiffness may be acceptable, and in such a case, each first section 11 may be a point weld of have a length L2 in the range of 2-15 mm, while each second section 12 may have a length L3 in the range of 15-60 mm.

Figure 4:
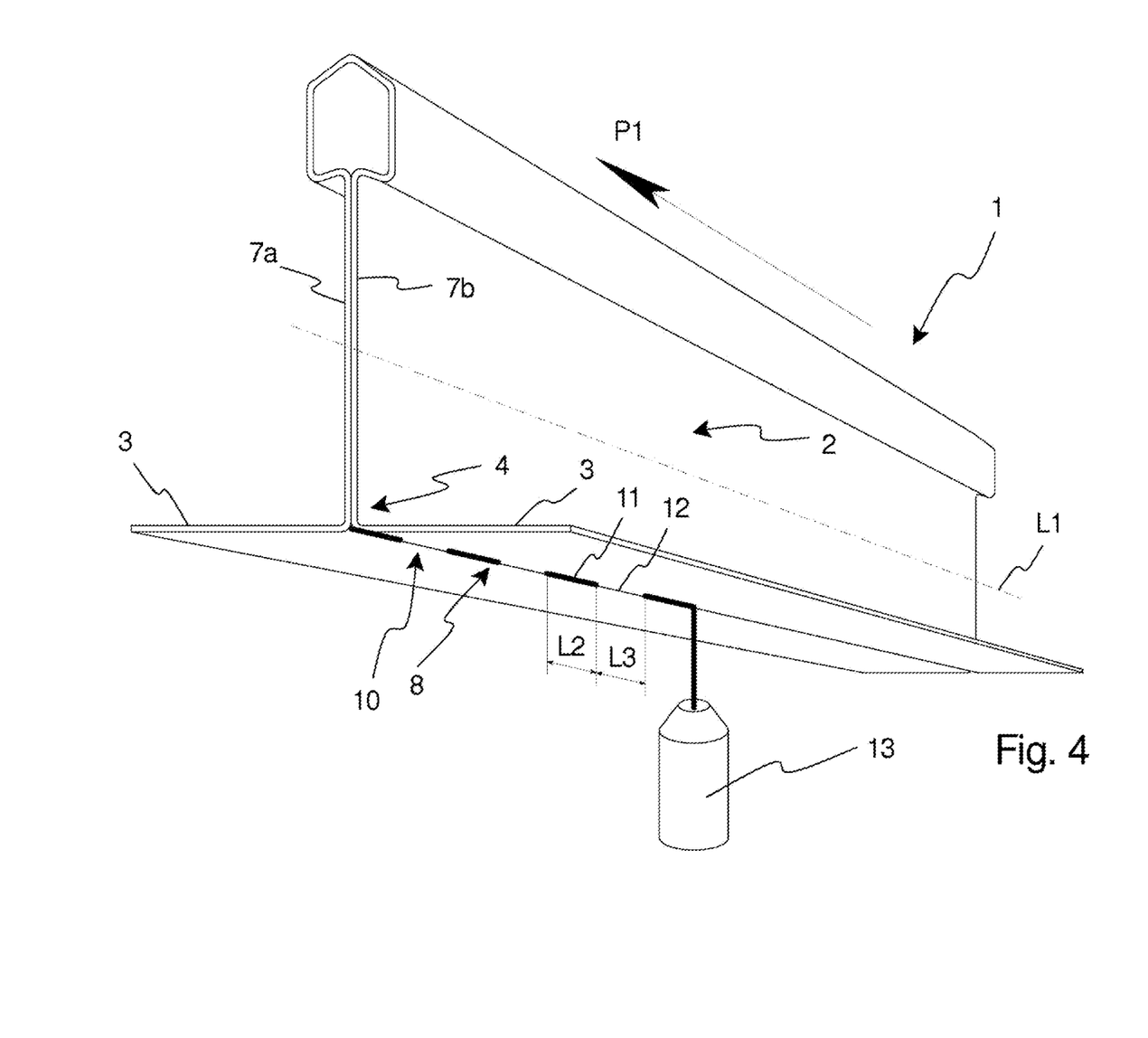
FIG. 4 is a perspective view illustrating a step of a method for manufacturing a profile member in accordance with the present invention.

In FIG. 4, to which reference now is made, a step of a method in accordance with the present invention for manufacturing a profile member 1 of the type described above is shown.

In a first step, not disclosed in FIG. 4, a sheet metal material is formed into a T-shaped profile member with a web having two web side walls, and a pair of oppositely disposed flanges projecting from a bottom portion of the web. The flanges may project at right angle from the web and thus form essentially horizontally disposed flanged.

The forming of the sheet metal material into the T-shaped profile member may be performed in a conventional roll forming operation.

The method step illustrated in FIG. 4 relates to the step of laser welding the elongated T-shaped profile member 1 by means of a laser welding apparatus 13 for providing a laser weld joint 8 extending in the longitudinal direction L1 of the profile member 1 and joining the two web side walls 7a, 7b of the profile member 1 to each other.

The profile member 1 is moved relative the laser welding apparatus in a direction indicated by arrow P1 during the laser welding. The relative movement, which also may be referred to as a feeding rate, may be in the range of 20-120 m/min.

In the figure, the laser weld joint 8 is applied from a bottom side of the profile member 1, in a gap 10 extending in the longitudinal direction L1 of the profile member 1. The gap 10 is formed in the bottom portion 4 of the web 2 where the flanges 3 meet the web side walls 7a, 7b.

Figure 5:
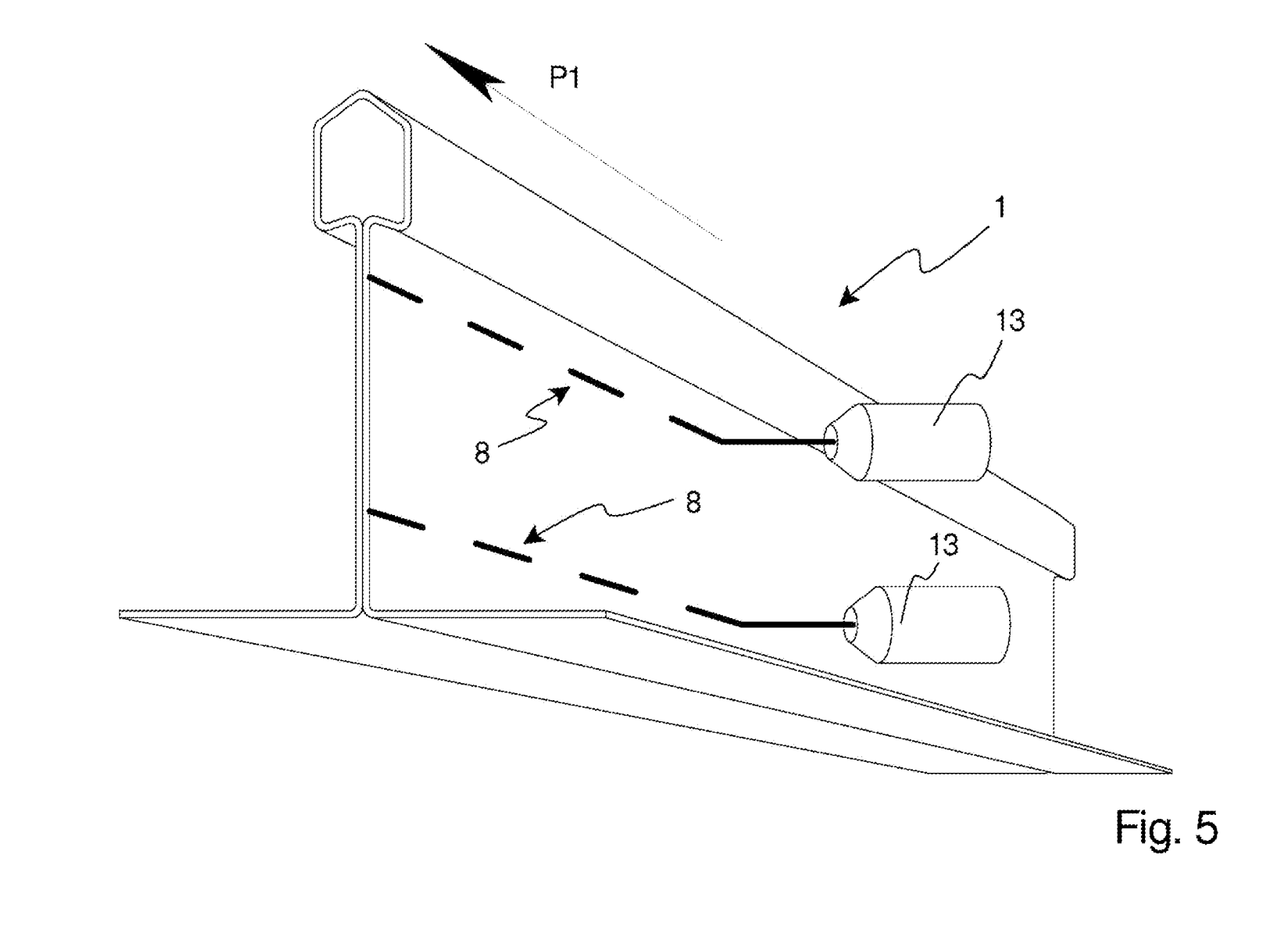
FIG. 5 is a perspective view illustrating an alternative method for manufacturing a profile member in accordance with the present invention.

It is understood that the laser weld joint 8 may be applied at other locations of the web 2 and that more than one laser weld joint 8 may be applied to the profile member 1. As a non-limiting example, FIG. 5 discloses the application of two laser weld joints 8 to the web 2 from a lateral side of the profile member 1.

The step of laser welding comprises alternatingly performing a first and a second operation.

The first operation is different from the second operation.

By alternatingly performing the first and the second operation, a laser weld joint 8 is obtained comprising alternating first sections 11 associated to the first operation and second sections 12 associated to the second operation. As the first and second operations are different, the first sections 11 will be different from the second sections 12. Thus, the resulting laser weld joint 8 will comprise alternating first and second sections 11, 12 having different properties.

Each first section 11, which thus is obtained by performing the first operation, is a welded section.

Each second section 12 obtained by performing the second operation may be a welded or a non-welded section.

The first operation comprises laser welding at a first energy level as measured at point where the laser beam interacts with the work piece, i.e. the profile member 1.

The second operation may comprise laser welding at a second energy level as measured at a point where the laser beam interacts with the work piece, i.e. the profile member, wherein the second energy level is below the first energy level.

The first energy level may be sufficient for obtaining a laser weld of conduction/penetration mode type (also referred to as transition mode type) or penetration mode type in each first section 11 of the laser weld joint 8.

The second energy level may be sufficient for obtaining a laser weld of conduction mode type in each second section 12 of the laser weld joint 8.

Alternatively, the second energy level may be zero, resulting in each second section 12 of the laser weld joint 8 being a non-welded section.

In order to alternatingly perform the first and second operations during the laser welding of the profile member 1, the laser welding apparatus 13 may be controlled in different ways.

For instance, a rotating screen/reflector (not shown) may be provided arranged to intermittently allowing the laser beam emitted from the laser welding apparatus 13 to pass the rotating screen/reflector and to engage with the profile member. Thus, each time the laser beam is allowed to pass the screen/reflector, the first operation of the laser welding step is performed, and each time the laser beam is screened/reflected, the second step of the laser welding step is performed.

Alternatively, the laser weld apparatus may alternatingly be turned on and off, in which case the turned-on state would represent the first operation and the turned-off state would represent the second operation.

The use of a rotating screen/reflector or by turning the laser welding apparatus 13 on/off results in the second section 12 of the laser weld joint 8 being a non-welded section.

It would also be conceivable to alternatingly vary the power input to the laser welding apparatus 13, resulting in the laser welding apparatus 13 to alternatingly emit a laser beam at the first energy level and a laser beam at the second energy level. Thus, emitting the laser beam at the first energy level would correspond to the first operation of the step of laser welding and emitting the laser beam at the second energy level would correspond to the second operation.

The power input to the laser welding apparatus 8 during the first and if appropriate the second operation may be constant. However, it would also be conceivable to vary the power input during each operation. Thus, during each operation, a power pulse may be utilized for generation of the laser beam, which power pulse may be a square pulse, a spike pulse or an annealing pulse.

The switch between the first operation and the second operation may also involve modification of the focus point of the laser beam emitted from the laser welding apparatus 13.

Thus, according to the present invention, an elongate profile member is manufactured by forming a sheet metal material into a T-shaped profile member and subsequently laser welding the profile member for providing a laser weld joint joining the two web side walls of the web to each other. The step of laser welding comprises alternatingly performing a first operation and a second operation, whereby the laser weld joint obtained comprises along its extension alternating welded first sections associated to the first operation and second sections associated to the second operation.

The second operation comprises laser welding at an energy level which is below the energy level used for performing the first operation, and may in some cases even be zero. Thus, the thermal energy transferred to the profile member may be lowered while a laser weld joint improving the strength and rigidity of the profile member still can be provided. The reduced thermal energy may ensure reduction of thermal induced deformation of the profile member.

In a practical test, laser weld joints comprising alternating welded first sections and non-welded second section was applied to elongate profile members. The switch between the first operation for providing the first sections and the second operation for providing the second sections was made by turning on/off the laser welding apparatus. It was surprisingly found that the feeding rate, i.e. the relative movement between the laser welding apparatus and the profile member, could be increased while still obtaining a high weld quality as compared to a continuous laser welding operation.

It will be appreciated that the present invention is not limited to the embodiments shown. Several modifications and variations are thus conceivable within the scope of the invention which thus is exclusively defined by the appended claims.

What is claimed is:

1. A method for manufacturing a profile member for a suspended ceiling system, comprising
    forming a sheet metal material into an elongate T-shaped profile member with a web having two web side walls and a pair of oppositely disposed flanges projecting from a bottom portion of the web, and
    laser welding the elongate T-shaped profile member for providing a laser weld joint extending straight in a longitudinal direction of the T-shaped profile member and joining the two web side walls to each other, characterized in that
    the step of laser welding comprises alternatingly performing a first operation and a second operation,
    whereby a laser weld joint is provided comprising a plurality of welded first sections associated to the first operation and a plurality of welded second sections associated to the second operation, wherein the welded first sections and welded second sections are alternatingly arranged along the extension of the laser weld joint,
    wherein laser welding is applied continuously in the first operation and not continuously in the second operation,
    wherein an energy level that each application of laser welding reaches during the second operation is below an energy level that each application of laser welding reaches during the first operation.

2. The method according to claim 1, wherein each first section is formed as a point weld.

3. The method according to claim 1, wherein each first section is given a length L2 in the range of 2-15 mm.

4. The method according to claim 1, wherein each second section in given a length L3 in the range of 1-60 mm.

5. The method according to claim 1, wherein the laser welding is performed at a feeding rate in the range of 20-120 m/min.

6. The method according to claim 1, wherein the laser weld joint is applied at the bottom portion of the web.

7. The method according to claim 6, wherein the laser weld joint is applied in a gap extending in the longitudinal direction of the T-shaped profile member and formed in the bottom portion where the flanges meet the web side walls.

8. The method according to claim 1, wherein the step of forming the sheet metal material into the elongate T-shaped profile is performed in a roll forming operation.

9. The method according to claim 1, wherein the sheet metal material has a thickness in the range of 0.1-0.6 mm.

10. The method according to claim 1, wherein the step of forming the sheet metal material into the elongate T-shaped profile member further comprises forming a bulb adjoining a top portion of the web.

* * * * *